UNITED STATES PATENT OFFICE.

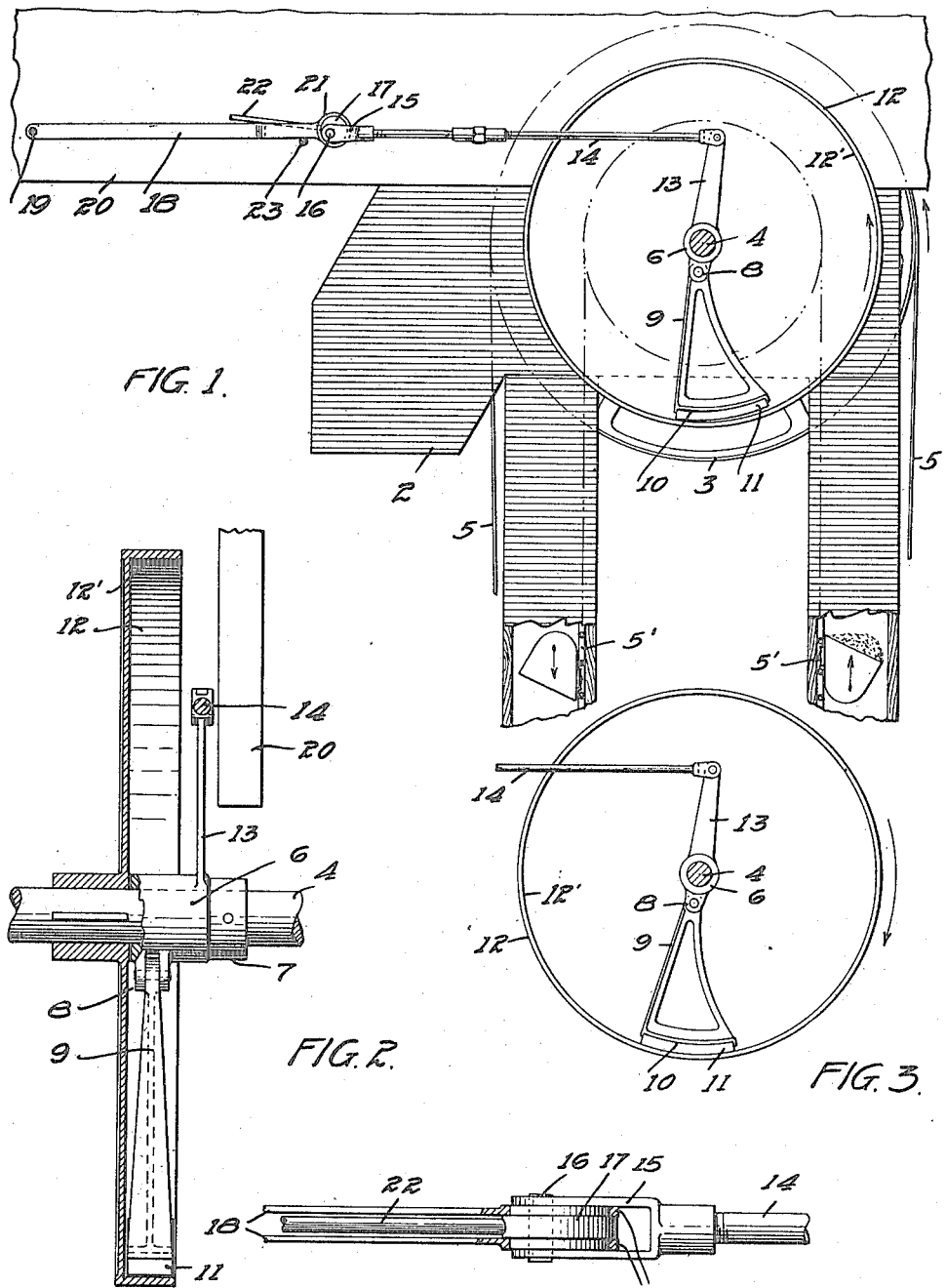

CHARLES GEMLO, OF MINNEAPOLIS, MINNESOTA, ASSIGNOR TO STRONG-SCOTT MANUFACTURING COMPANY, OF MINNEAPOLIS, MINNESOTA, A CORPORATION.

BACK-STOP FOR ELEVATOR-HEAD PULLEYS.

1,208,537.    Specification of Letters Patent.    Patented Dec. 12, 1916.

Application filed September 7, 1915. Serial No. 49,195.

*To all whom it may concern:*

Be it known that I, CHARLES GEMLO, citizen of the United States, resident of Minneapolis, county of Hennepin, State of Minnesota, have invented certain new and useful Improvements in Back-Stops for Elevator-Head Pulleys, of which the following is a specification.

In the operation of an elevator head or conveyers having pockets, it often happens that a breakage or slippage of some of the parts will result in allowing the elevator with the loaded buckets to run down to the foot of the elevator and cause considerable damage to the machinery before the movement can be arrested.

The object of my invention, therefore, is to provide improved means for checking the movement of the elevator the instant there is any backward or downward travel.

The invention consists generally in various constructions and combinations, all as hereinafter described and particularly pointed out in the claims.

In the accompanying drawings forming part of this specification, Figure 1 is a detail sectional view of a portion of a countershaft and one of the elevator heads, illustrating the application of my back stop thereto, Fig. 2 is a detail sectional view of the counter-shaft brake-pulley, Fig. 3 is a side view, illustrating the back stop in its locking position, Fig. 4 is a detail view, showing the cam mechanism for use in releasing the back stop from the surface of the pulley.

In the drawing, 2 represents an elevator head and 3 a pulley secured on the countershaft 4 and provided with a drive belt 5. The elevating belts 5' pass over a pulley, indicated by dotted lines in Fig. 1, and there may be a series of these belts and pulleys on the one shaft, operated from a drive belt 5 and controlled through the single brake-pulley, which I will now describe in detail.

Upon the shaft 4 is a hub 6 held in place by a collar 7 and on one side of this hub are ears 8 wherein an arm 9 is pivoted. This arm has a curved outer surface 10 to receive a friction shoe 11 and a brake pulley 12 is keyed to said shaft and has an internal friction surface 12' to contact with the shoe 11 and positively lock the pulley against backward movement. Normally, the pulley will be turning in the direction indicated by the arrow in Fig. 1, with one end of the shoe 11 lightly contacting with the friction surface of the pulley and pushed toward the direction of movement of the pulley as it revolves. In case, however, of breakage of some part of the mechanism or the belt 5 on the pulley 3, and the weight of the loaded buckets begins to revolve the brake-pulley 12 in the opposite direction, the arm 9 will be carried with the pulley and the shoe 11 will be wedged between the friction surface of the pulley and the pivot of the arm, whereupon the pulley will be rigidly locked against further backward movement. An arm 13 projects upwardly from the hub 6 and is pivotally connected to a rod 14 having a clevis 15, the arms of which are mounted on a pin 16 of an eccentric 17. A bar 18 is fastened at 19 to a timber 20 and has an eccentric strap 21 for the eccentric 17. A lever 22 is mounted on the eccentric and is normally in the position indicated in Fig. 1, with the bars 18 supported on a pin 23. The pin 16 will normally be below the center of the eccentric and will hold the arm 13 and the arm 9 in an inoperative position with respect to the friction surface of the pulley. In case, however, of backward movement of the pulley, the shoe 11 will engage the friction surface and hold it firmly against further backward movement and whenever desired, the operator, grasping the handle 22, can throw the eccentric to its other position and release the locking shoe.

In various ways the details of construction herein shown and described may be modified and still be within the scope of my invention.

I claim as my invention:

1. The combination, with a shaft, of a drive pulley and belt, a brake pulley secured on said shaft and having an internal friction surface, a hub loosely mounted on said shaft, an arm pivotally connected with said hub and normally depending in an idle position therefrom, a shoe mounted in the lower end of said arm in position to engage the friction surface of said brake pulley upon backward movement thereof, a second arm projecting from said hub, and means connected with said second arm for operating said hub to release said locking arm when it has been moved to its locking position by the backward movement of said brake pulley.

2. The combination, with a shaft, of a brake pulley secured thereon and having an internal friction surface, a hub loosely and concentrically mounted on said shaft, an arm having a pivotal connection with said hub and provided with a friction shoe for engaging said surface on the initial backward movement of said brake pulley, said arm and its pivot forming a toggle between said hub and its friction surface, the rocking of said hub shifting the pivotal connection of said hub and arm to release said shoe, and means for rocking said hub.

3. The combination, with a shaft, of a drive pulley and belt, a brake pulley secured on said shaft and having an internal friction surface, a hub loosely mounted on said shaft, an arm pivotally connected with said hub and normally depending in an idle position therefrom, a shoe mounted in the lower end of said arm in position to engage the friction surface of said brake pulley upon backward movement thereof, and means for releasing said arm and shoe from their locking position.

In witness whereof, I have hereunto set my hand this 3d day of September 1915.

CHARLES GEMLO.

Copies of this patent may be obtained for five cents each, by addressing the "Commissioner of Patents, Washington, D. C."